United States Patent
Ezrielev et al.

(10) Patent No.: US 12,047,439 B1
(45) Date of Patent: Jul. 23, 2024

(54) SYSTEM AND METHOD FOR MANAGEMENT OF WORKLOAD DISTRIBUTION IN SHARED ENVIRONMENT

(71) Applicant: Dell Products L.P., Round Rock, TX (US)

(72) Inventors: Ofir Ezrielev, Be'er Sheva (IL); Roman Bober, Ashdod (IL); Lior Gdaliahu, Modi'in (IL); Yonit Lopatinski, Shomria (IL); Eliyahu Rosenes, Bet Shemesh (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/307,276

(22) Filed: Apr. 26, 2023

(51) Int. Cl.
*H04L 67/1004* (2022.01)

(52) U.S. Cl.
CPC ................ *H04L 67/1004* (2013.01)

(58) Field of Classification Search
CPC . H04L 67/1004; H04L 67/1025; H04L 41/22; H04L 67/1008
See application file for complete search history.

(56) References Cited

U.S. PATENT DOCUMENTS

| | | |
|---|---|---|
| 10,673,716 B1 * | 6/2020 | Sethuramalingam ........... G06F 16/9024 |
| 2012/0297238 A1 | 11/2012 | Watson et al. |
| 2019/0045374 A1 | 2/2019 | Loomba et al. |
| 2020/0004582 A1 * | 1/2020 | Fornash ............ G06F 9/4856 |
| 2020/0379805 A1 | 12/2020 | Porter et al. |
| 2021/0105322 A1 * | 4/2021 | Sakashita ........... H04L 67/1097 |
| 2022/0182294 A1 * | 6/2022 | Li ........................ H04L 41/22 |
| 2022/0237016 A1 * | 7/2022 | Kamiya ............ G06F 9/4856 |
| 2023/0056042 A1 * | 2/2023 | Vichare ............ G06F 9/4843 |
| 2023/0134096 A1 * | 5/2023 | Boyapalle ......... G06N 20/00 718/105 |

* cited by examiner

*Primary Examiner* — Benjamin M Thieu
(74) *Attorney, Agent, or Firm* — Womble Bond Dickinson (US) LLP

(57) ABSTRACT

Methods and systems for managing workloads are disclosed. The workloads may be supported by operation of workload components that are hosted by infrastructure. The hosted locations of the workload components by the infrastructure may impact the performance of the workloads. To manage performance of the workloads, an optimization process may be performed to identify a migration plan for migrating some of the workload components to other infrastructure such as shared edge infrastructure. Migration of the workload components may reduce the computing resource cost for performing various workloads.

20 Claims, 9 Drawing Sheets

SYSTEM AND METHOD FOR MANAGEMENT OF WORKLOAD DISTRIBUTION IN SHARED ENVIRONMENT

FIELD

Embodiments disclosed herein relate generally to workload management. More particularly, embodiments disclosed herein relate to systems and methods to manage workload distribution across shared infrastructure.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
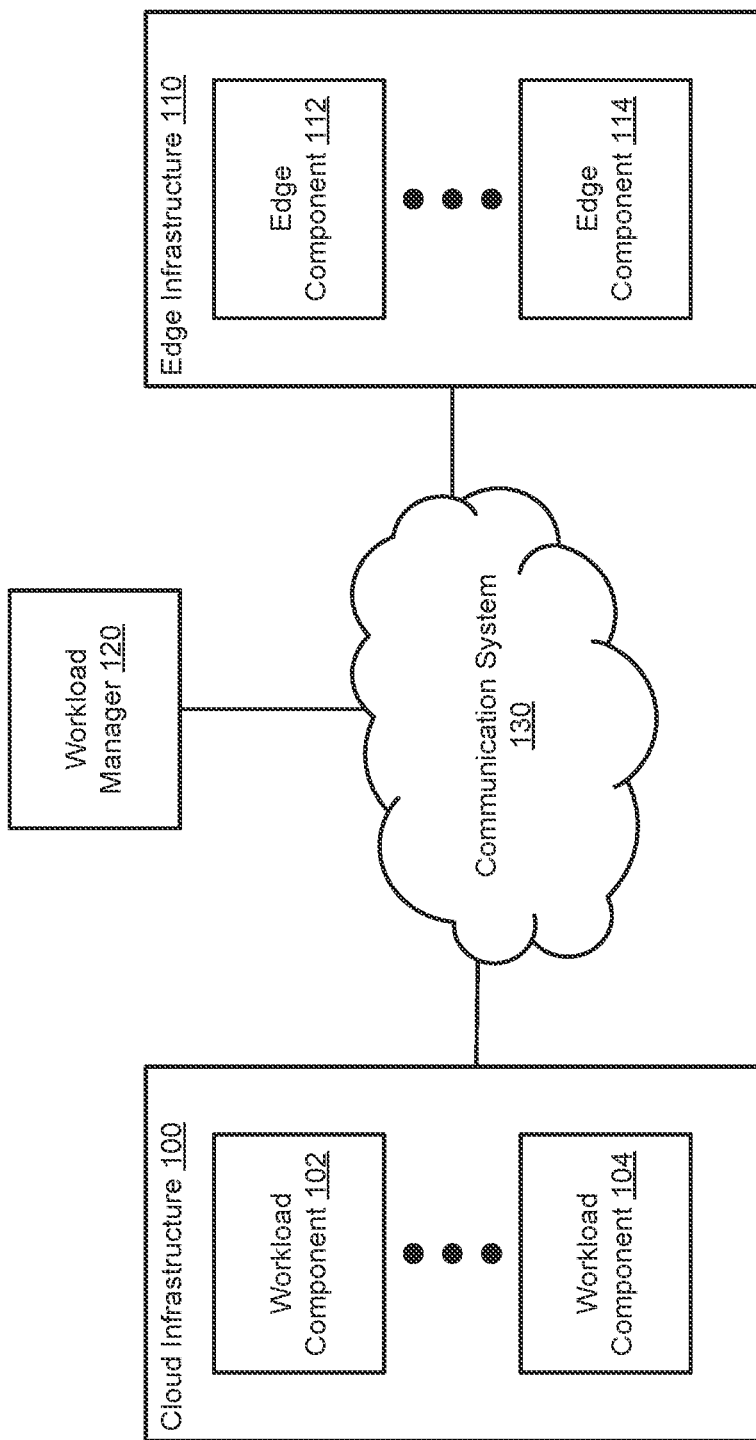
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distribution of workloads across infrastructure. For various reasons, workloads may be preferentially hosted by cloud infrastructure. For example, cloud infrastructure may provide a computing environment that is easier to manage, may be more uniform in implementation, etc.

However, the performance of the workloads may depend on factors such as data source locations, latency between data sources and cloud infrastructure, etc. To improve the performance of workloads and/or provide other benefits, some of the workload components that support performance of the workloads may be migrated to edge infrastructure. The edge infrastructure may provide performance advantages in some scenarios, and performance disadvantages in other scenarios.

To identify which workload components to migrate, a system in accordance with embodiments disclosed herein may perform a global optimization process. During the global optimization process, a graph representation of the workload components may be divided into portions to establish potential migration plans for workload components corresponding to some of the portions of the graph representation. The fitness of each potential migration plan may be evaluated through simulation. The fitness may be used to both identify new potential migration plans (e.g., through iterations of the global optimization process) and select whether to implement any of the migration plans.

To further improve computing resource use efficiency, multiple workloads may be considered for co-migration to shared edge infrastructure. The workloads may be performed for various organizations. In such scenarios, multiple graph representations may be used to establish migration plans, with similar global optimization processes performed to discriminate potential migration plans that are more likely to result in performance gains and/or cost advantages from other potential migration plans that are unlikely to result in improved performed/reduced cost.

Once a migration plan is selected for implementation, the migration plan may be used to migrate some of the workload components hosted by cloud infrastructure to the edge infrastructure. By doing so, the resulting performance of any number of workloads post partial migration may be more likely to be desirable.

Thus, embodiments disclosed herein may address, among others, the technical problem of limited computing resources. By improving the likelihood of the workload post migration being more desirable, the cost for performing the global optimization and migration may be balanced against the likely gains in performance achieve through migration.

In an embodiment, a method for managing workload distribution across infrastructure is disclosed. The method may include identifying a first workload performed by cloud infrastructure of the infrastructure for at least partial migration to shared edge infrastructure of the infrastructure; identifying a second workload performed by the cloud infrastructure for at least partial migration to the shared edge infrastructure; obtaining a first graph representation of the first workload and a second graph representation of the second workload; obtaining a potential migration plan using the first graph representation, the second graph representation, and capabilities of edge components of the shared edge infrastructure; evaluating the potential migration plan to obtain a workload performance estimate; rating the potential migration plan based on the workload performance estimate; making a determination regarding whether to implement the potential migration plan based at least in part on the rating of the potential migration plan; and in an instance of the determination where the potential migration plan is to be implemented: migrating, based on the potential migration plan, at least a portion of the first workload from the cloud infrastructure to the shared edge infrastructure and at least a portion of the second workload from the cloud infrastructure to the shared edge infrastructure.

Evaluating the potential migration plan may include obtaining first input data for a past performance of the first workload; obtaining second input data for a past performance of the second workload; and simulating performance of the workload after the migrating using the first input data and the second input data.

Simulating the performance may include establishing a simulation component based on an edge component of the shared edge infrastructure; and configuring, based on the potential migration plan, the simulation component based on a workload component of the first workload and a workload component of the second workload.

The potential migration plan may specify that the workload component of the first workload and the workload component of the second workload are to be hosted by the edge component of the shared edge infrastructure.

The first input data may include a first portion of input data that drove operation of the workload component of the first workload, and the second input data may include a second portion of the input data that drove operation of the workload component of the second workload.

The potential migration plan may be obtained using global optimization.

The global optimization may be based on a genetic algorithm used to identify portions of the first graph representation and the second graph representation, the potential migration plan being based on the identified portions.

The first graph representation may include nodes and edges connecting a portion of the nodes.

The nodes may be based on workload components that support performance of the first workload, the workload components performing data processing actions.

The edges may be based on interactions between the workload components that support performance of the first workload.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, workloads may be performed by various components of the system. The workloads may be performed for various entities such as different organizations which may contract with an operator of cloud infrastructure 100 for performance of the workloads. The workloads may be logically segmented from one another in cloud infrastructure 100. Any number and type of workload may be hosted by cloud infrastructure 100.

Workload components (e.g., 102-104) hosted by various portions of the system may perform corresponding portions of the workloads. The workload components may include, for example, (i) executing services that may process data in any manner, (ii) sensors or other components for acquisition of new information, (iii) databases or other data storage entities for storing and providing copies of stored data, and/or other types of entities that facilitate performance of various actions as part of the workloads.

To perform the workloads, information may be exchanged between the workload components. Any type and quantity of information may be exchanged as part of performance of the workloads.

To facilitate performance of the workloads, workload components 102-104 may be hosted in cloud infrastructure 100. Cloud infrastructure 100 may be a managed computing environment that may facilitate instantiation and operation of any number of workload components. For example, cloud infrastructure 100 may include any number of data processing systems, orchestration layers, abstraction layers, and/or other entities that facilitate operation of the workload components.

However, the resource cost (e.g., electrical, financial, computational, etc.) for operation of workload components 102-104, distribution of information to support performance of the workloads by workload components 102-104, and/or other actions in performance of the workloads may depend on where workload components are hosted, where data (e.g., input data) used in the workloads is acquired, and/or other characteristics of the hardware environments that host the workload components.

For example, consider a scenario where a workload includes processing of data from a range of internet of things devices. If the workload components used to perform the workload are hosted by cloud infrastructure 100, information collected by the internet of things devices may need to traverse through edge systems and various networks to reach cloud infrastructure 100 thereby introducing computational overhead, latency, and/or other types of overhead for performance of the workloads. Thus, while placement of workload components in cloud infrastructure 100 for such workloads may have lower barriers to implementation due to the ease of deployment and management, doing so may introduce overhead that may not be otherwise be present if the workload components are more broadly distributed across various types of infrastructure.

In general, embodiments disclosed herein may provide methods, systems, and/or devices for managing performance of workloads. The disclosed systems may manage performance of workloads through management of the distribution of workload components across a variety of different types of infrastructure. The different types of infrastructure may include, for example, (i) cloud infrastructure 100, (ii) edge infrastructure 110, and/or other types of infrastructure. By distributing any number and type of workload components 102-104 across various types of infrastructure, the overhead for performance of a workload may be reduced if appropriate deployment locations for the workload components are appropriately chosen.

To select deployment locations for the workload components, the system of FIG. 1 may perform an optimization process. During the optimization process, a graph representation of the workload components for a workload may be divided into portions. Some of the portions of the workload components may be selected for hosting by edge infrastructure 110 (or edge components 112-114 thereof) to establish a potential migration plan. The potential migration plan may then be evaluated through simulating operation of the workload components based on the new distribution specified by the potential migration plan. The evaluation may then be used to ascertain whether the potential migration plan is beneficial or detrimental for a workload when compared to an existing distribution of the workload components (e.g., entirely hosted by cloud infrastructure 100).

The determination may then be used to either (i) initiate a redistribution process for the workload components based on the potential migration plan and/or (ii) initiate establishment of a new potential migration plan, which may take into account the beneficial or detrimental impact of the potential migration plan on performance of the workload. By doing so, the system may facilitate identification and implementation of migration plans that may reduce the resource cost for providing various computer implemented services. Accordingly, a system in accordance with embodiments disclosed herein may more efficiently marshal limited computing resources for providing computer implemented services.

In some cases, multiple workloads may be considered for co-redistribution. For example, if multiple entities that have contracted with an operator of cloud infrastructure 100 are interested in reduce resource costs/overhead for performance of their workloads, then multiple workload may be considered for migration. To do so, graph representation of multiple workloads may be analyzed to identify potential migration plans. The potential migration plans may, for example, (i) specify that some workload components from multiple workloads (performed for different entities) are to be migrated to the same edge components of edge infrastructure, (ii) specify that other workload components for the workloads may be migrated to different edge components, and/or (iii) still other workload components for the workloads are to be retained on cloud infrastructure 100. Consequently, the potential migration plans may result in co-deployment of workload components for different workloads to similar edge components. The potential migration plans may be evaluated and rated, as discussed above.

To provide the above noted functionality, the system of FIG. 1 may include cloud infrastructure 100, edge infrastructure 110, workload manager 120, and communication system 130. Each of these components is discussed below.

Cloud infrastructure 100, as discussed above, may include any number of data processing systems for hosting any number of workload components for performance of any number of workloads. The data processing systems of cloud infrastructure 100 may be positioned in a high density computing environment such as a data center. The data center may include any number of tools for manageability of workload components. Cloud infrastructure 100 may be implemented using a public and/or private cloud computing environment, data center environment, etc.

Edge infrastructure 110 may include any number of data processing systems (e.g., edge components 112-114) for hosting any number of workload components. In contrast to cloud infrastructure 100, the components of edge infrastructure 110 may be located in edge environment and may lack many of the manageability tools available in high density computing environments. However, in contrast to cloud infrastructure 100, edge infrastructure 110 may be more broadly distributed geographically, and may be more likely to be located proximate to various data sources such as internet of things devices, personal computing devices, etc. Thus, selective placement of workload components in edge infrastructure 110, rather than cloud infrastructure 100, may provide benefits with respect to resource cost for performance of workloads. For example, the resource cost for transmitting data from data sources to workload components that process data for the data sources may be reduced.

Figure 2A:
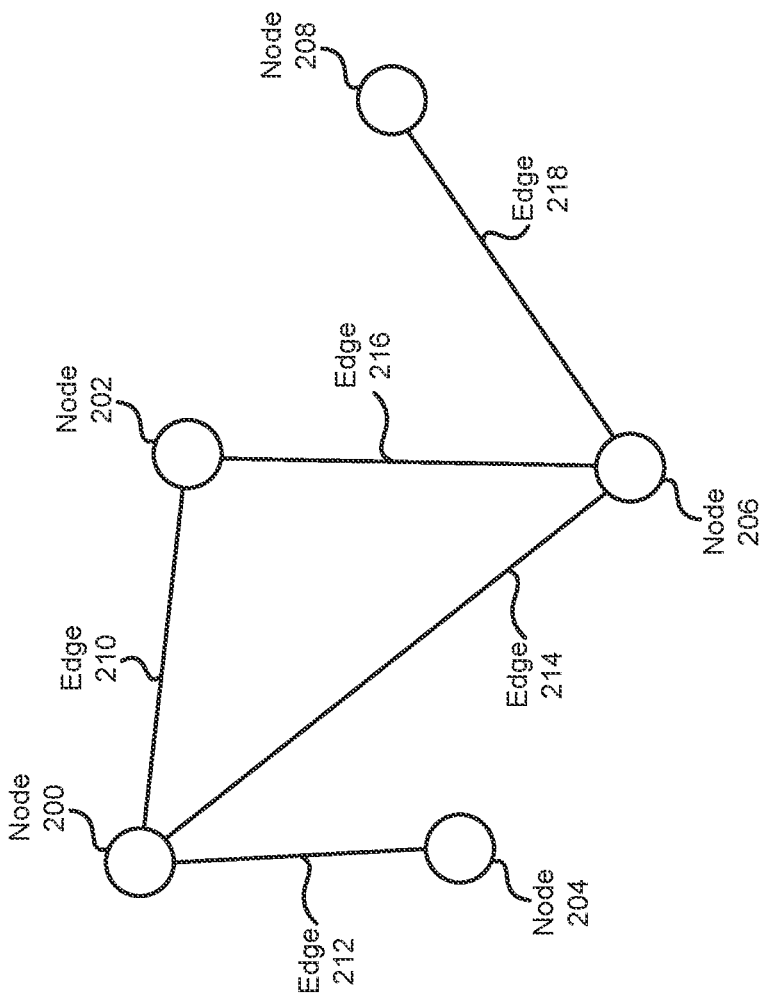
FIG. 2A shows a diagram of a graph representation of an example workload in accordance with an embodiment.
Figure 2B:
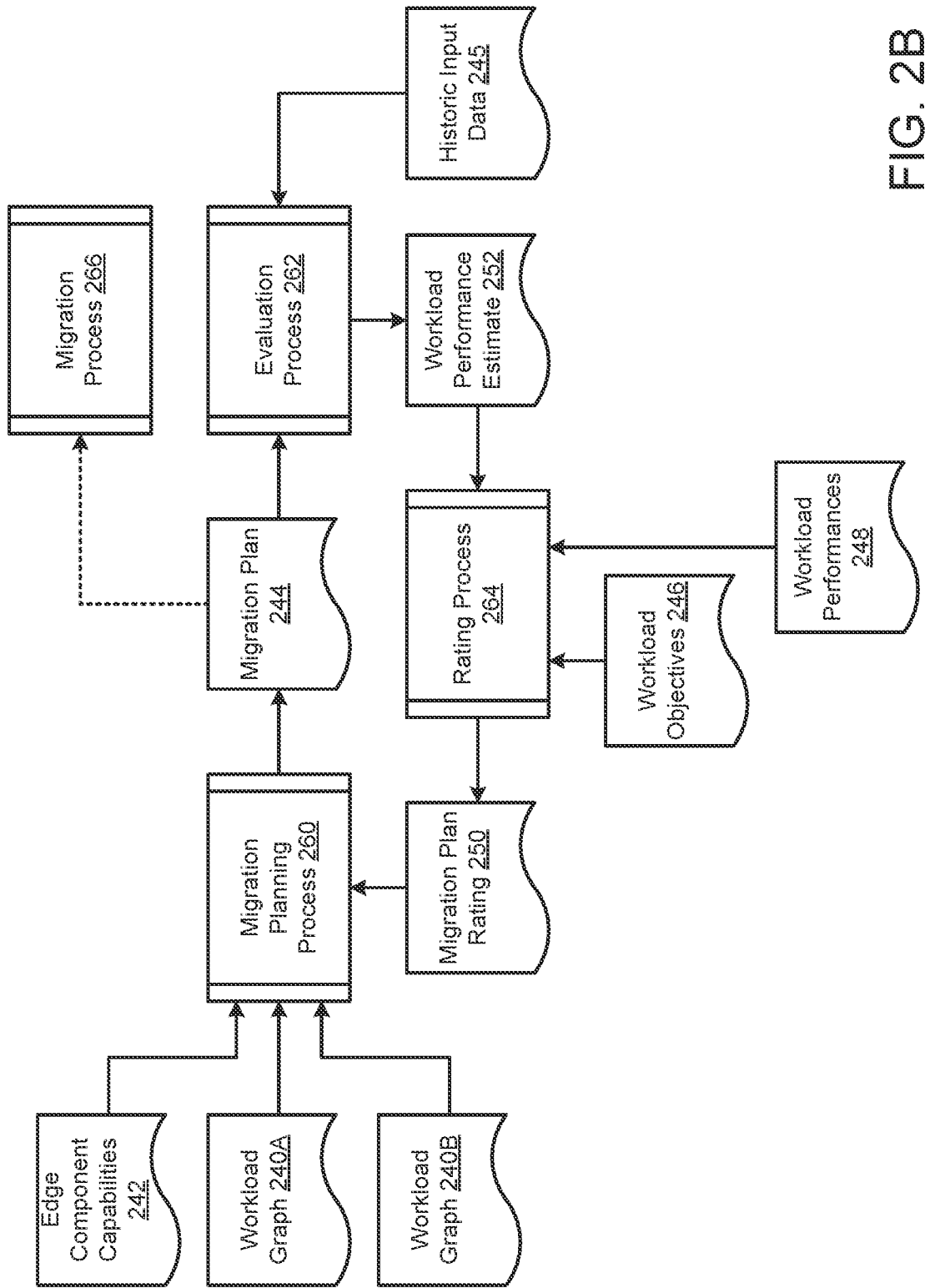
FIG. 2B shows a diagram illustrating data flows in accordance with an embodiment.
Figure 2C:
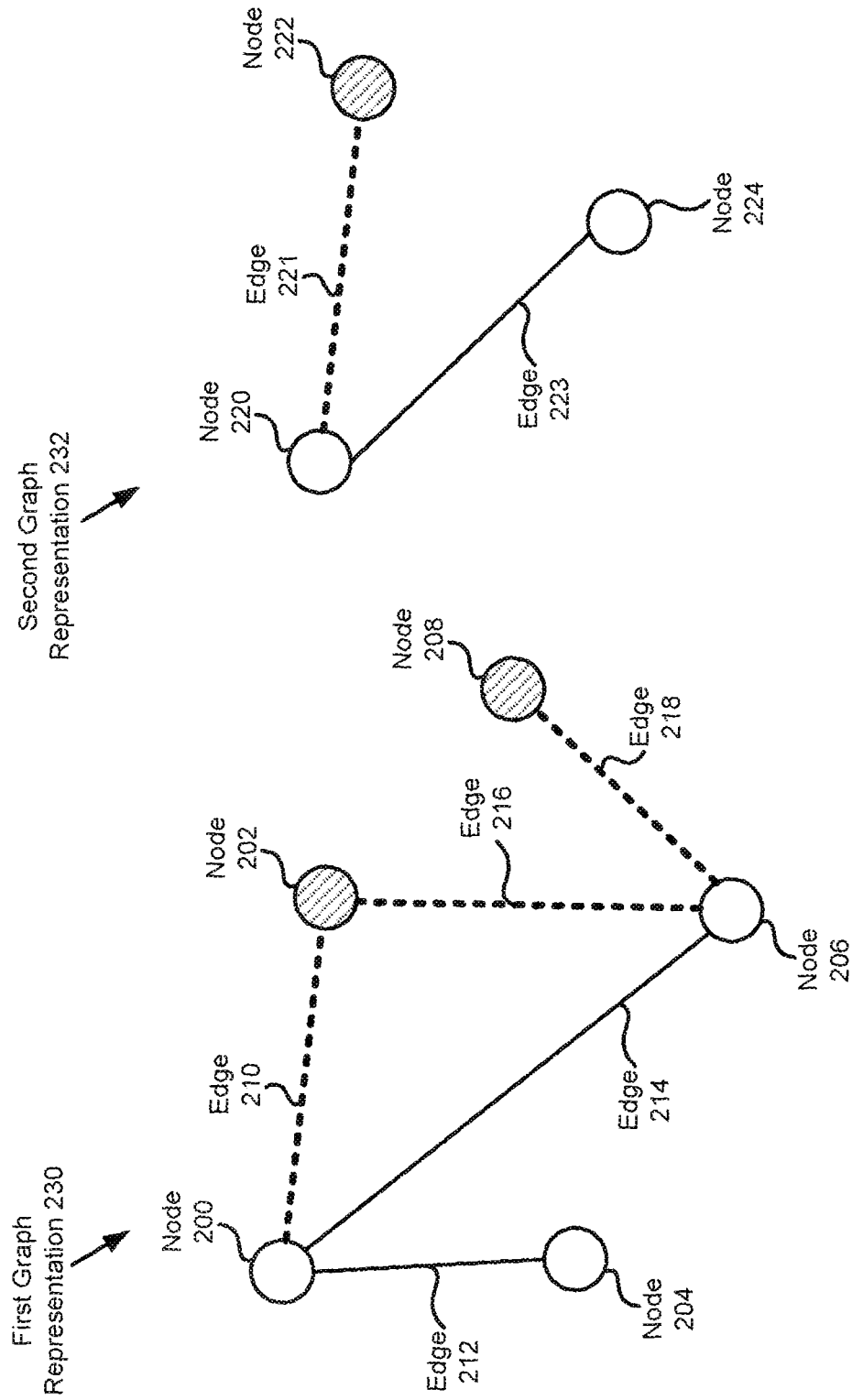
FIGS. 2C-2D show diagrams of graph representations of the example workload in accordance with an embodiment.
Figure 2D:
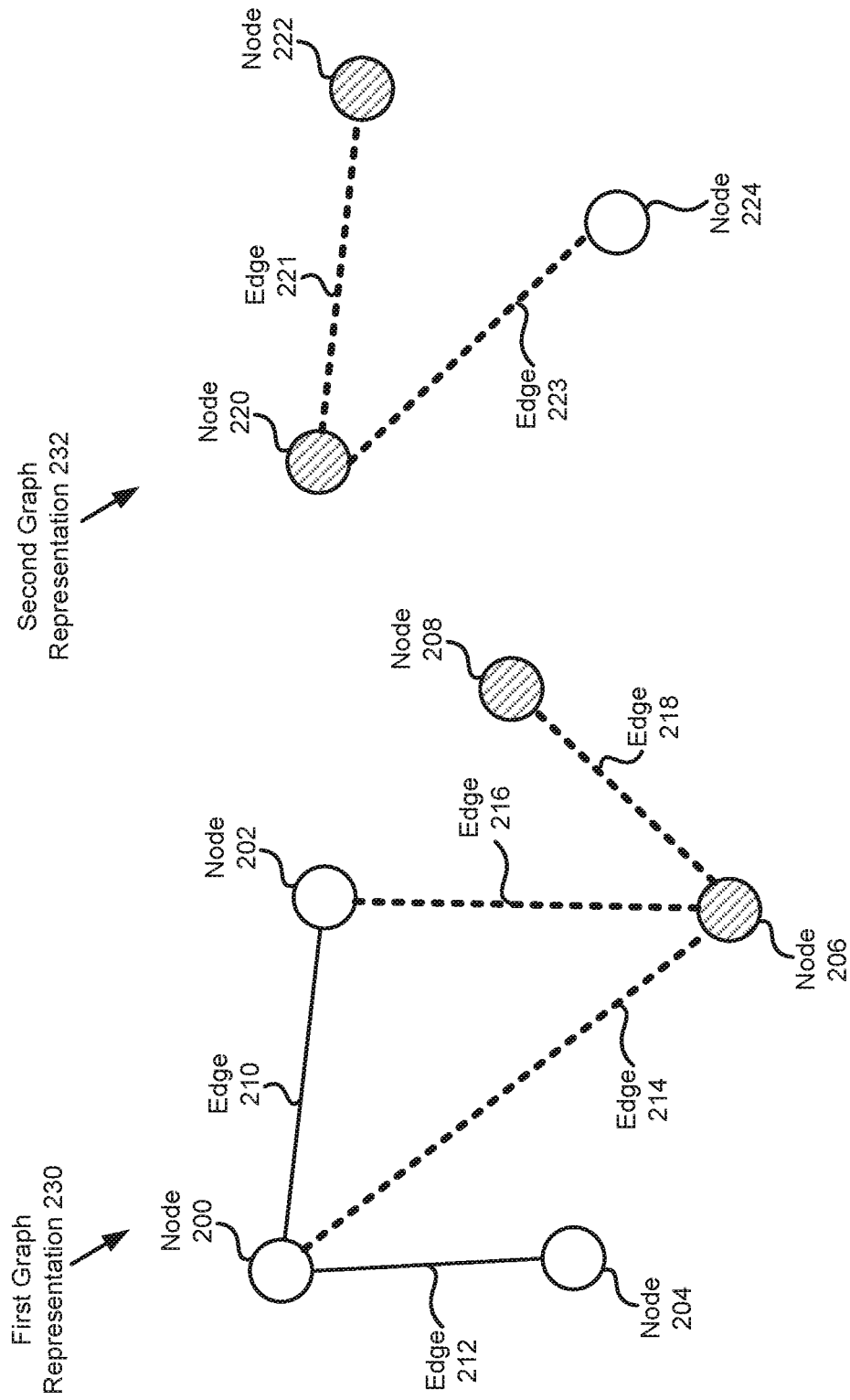

Workload manager 120 may manage the distribution of workload components across cloud infrastructure 100 and edge infrastructure 110. To do so, workload manager 120 may (i) analyze existing distributions of workload components (e.g., to identify performance levels of the existing distribution of the workload components) for various workloads, (ii) sequentially generate and evaluate new potential distributions of the workload components for one or more of the workloads across cloud and edge infrastructure (e.g., through simulation and global optimization processes), and (iii) initiate evaluation and potential implementation of the new potential distributions of the workload components. Refer to FIGS. 2B-2D for additional details regarding generation and evaluation of potential distributions of workload components.

To identify new potential distributions, workload manager 120 may use graph representation of existing distributions of the workload components for one or more workloads. The graph representations may be used to identify sub-portions of the graph representations that may be beneficial to migrate from cloud to edge infrastructure. Refer to FIG. 2A for additional details regarding graph representations of distributions of workload components for a workload.

Figure 2E:
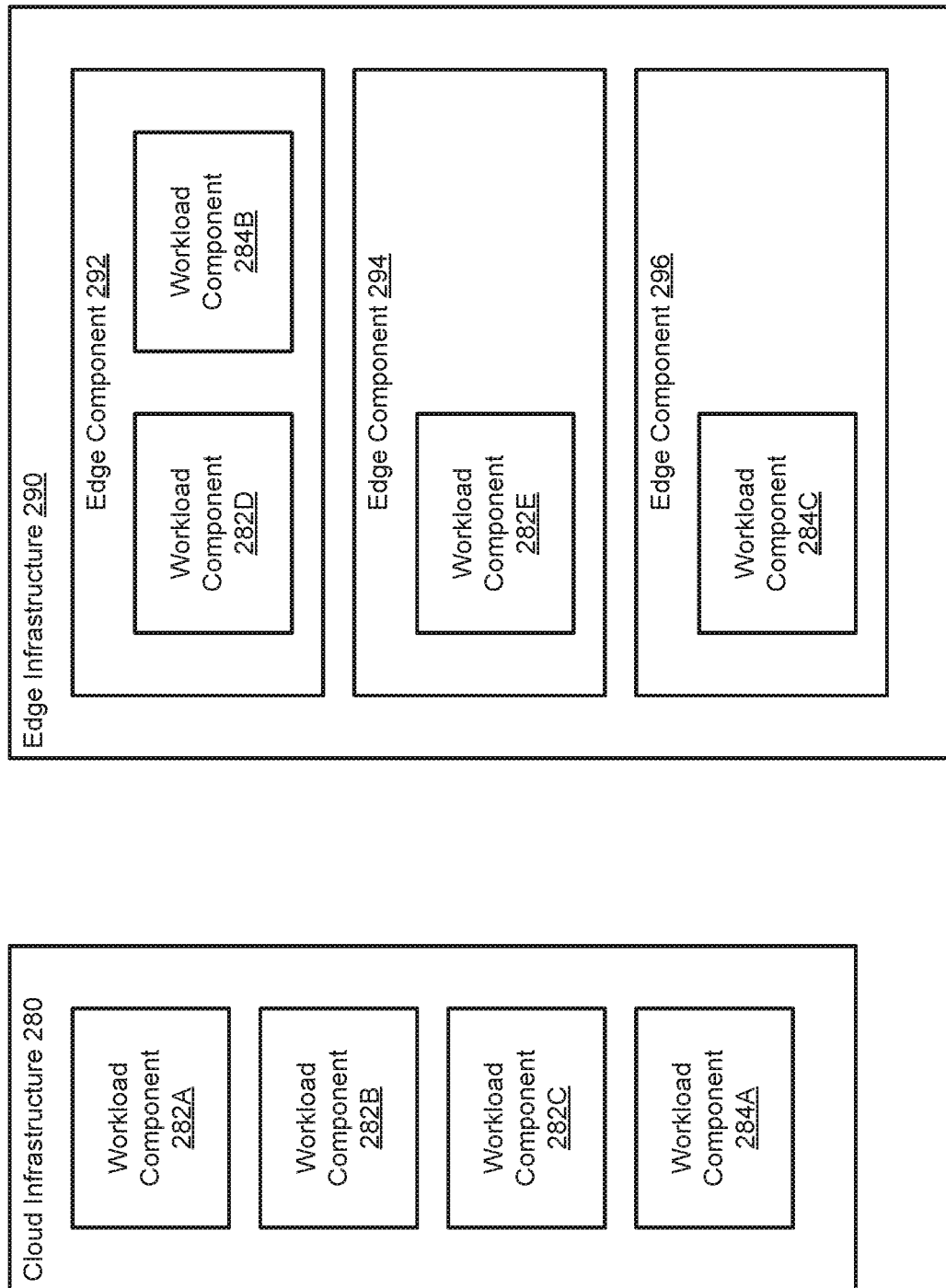
FIG. 2E shows a diagram of an example workload component distribution post migration in accordance with an embodiment.
Figure 3:
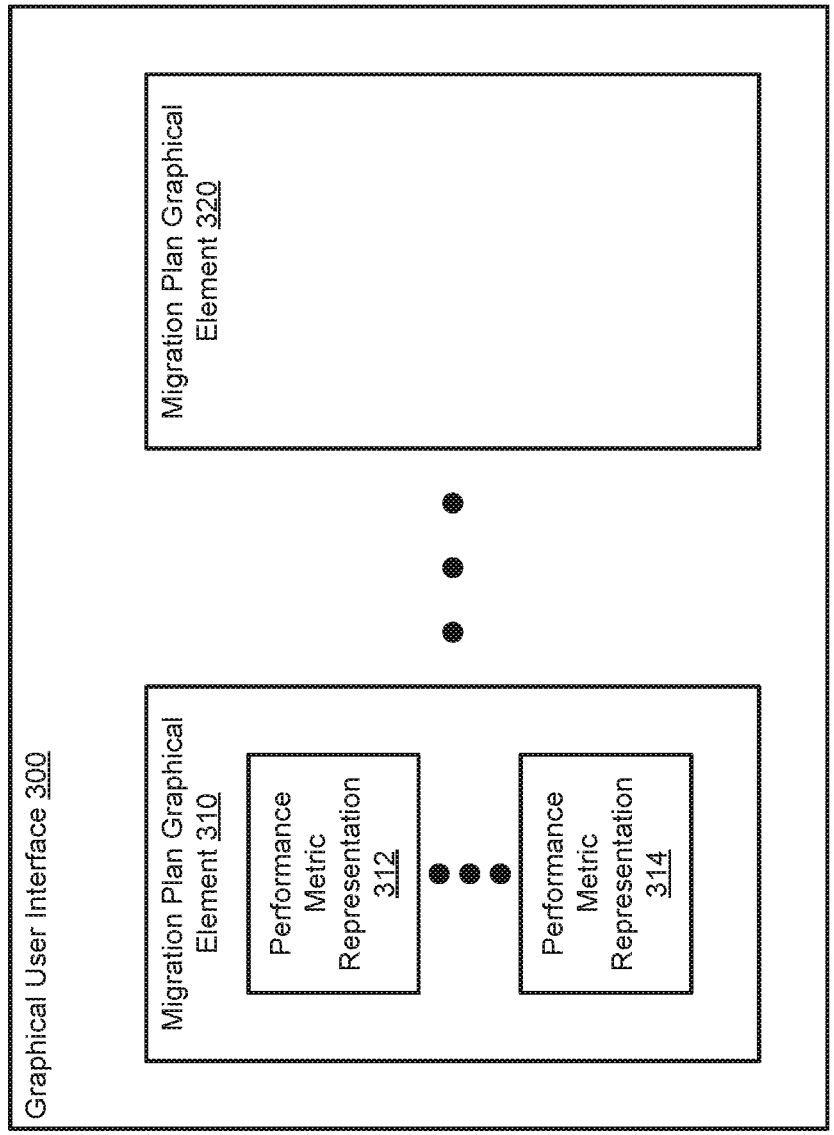
FIG. 3 shows a diagram of a graphical user interface in accordance with an embodiment.

Once new potential distributions of the workload components are identified, the new potential distributions may be evaluated and serve as basis for migration plans. The results of the evaluations may be used to present information regarding the new potential distributions of the workload components (and corresponding migration plans) to decision makers for consideration via graphical user interfaces. The decision makers may authorize and migrate workloads based on the new potential distributions using the graphical user interfaces. When multiple workloads are being considered for co-migration, decision makers from multiple organization for which the workloads are being performed may use the graphical user interface to come to a consensus decision regarding which migration plan to implement. Refer to FIG. 3 for additional details regarding graphical user interfaces, and FIG. 2E for an example of placement of workload components for multiple workloads after an example migration.

Figure 4:
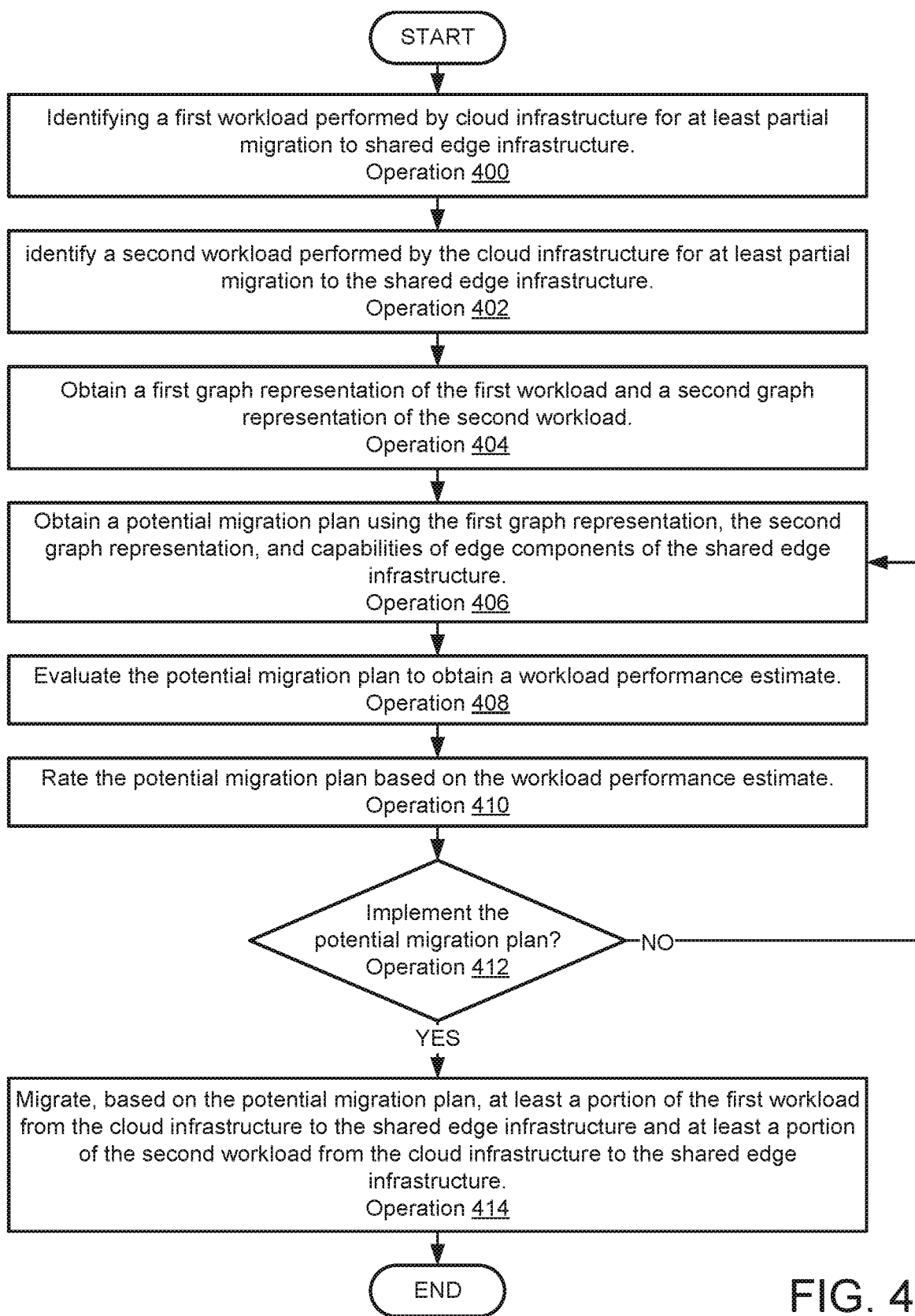
FIG. 4 shows a flow diagram illustrating a method of managing workloads in accordance with an embodiment.

When providing their functionality, any of cloud infrastructure 100, edge infrastructure 110, and workload manager 120 may perform all, or a portion, of the methods illustrated in FIG. 4.

Any of cloud infrastructure 100, edge infrastructure 110, and workload manager 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of instances of cloud infrastructure 100, edge infrastructure 110, workload manager 120, data sources such as internet of things devices/sensors/etc., and/or other components not shown in FIG. 1. Any of the instances may perform similar and/or different functions performed by other instances.

As discussed above, graph representations of workloads may be used to explore the benefits that may be obtained through migration of workload components to different infrastructure components. Turning to FIG. 2A, a diagram of a graph representation of a workload in accordance with an embodiment is shown.

The graph representation may include any number of nodes (e.g., 200-208) and edges (e.g., 210-218).

Each of nodes 200-208 may represent a workload component, as discussed above. The workload components may perform any number of data processing (e.g., obtaining new data, processing existing data to obtain new data, etc.). In FIG. 2A, all of nodes 200-208 may represent workload components of a workload distributed across cloud infrastructure.

Performance data for the workload components may also be monitored and retained (e.g., workload data for past performance of the workload). The performance data may include, for example, processing latencies, duration of time to complete computations, rate of computations that are performed, duration of times for and/or rates at which higher level processing such as query servicing is performed, etc.

Expectations for the performance of the workload and workload components may also be maintained. The expectations may be specified, by, for example, service level agreements or other specifications.

Other information regarding the performance of the workload and/or workload components may be maintained. The other information may include, for example, workload component operational costs, purposes of processing performed by different workload components, etc.

Any of the aforementioned information may be associated with corresponding nodes.

Edges 210-218 may interconnect some of nodes 200-208. Edges 210-218 may represent interactions between workload components that supports processing performed by the respective workload components. For example, the edges may represent data distributions between workload components represented by the nodes that support the processing performed by the respective workload components. As seen in FIG. 2A, not all edges may be connected by edges, and the specific arrangement and number of nodes and edges may depend on the workload.

As will be discussed in greater detail with respect to examples shown in FIGS. 2C-2D, the graph representation may be used to select some of the workload components for migration between infrastructure components. Refer to FIG. 2B for additional details regarding evaluation and potential implementation of migrations of workload components.

Any number of graph representations of workloads may be obtained. To establish migration plans for multiple workloads, multiple graph representations for the workloads may be used in global optimization processes which are discussed in greater detail below.

To further clarify embodiments disclosed herein, a diagram illustrating data flows implemented by and data structures used by a system over time in accordance with an embodiment is shown in FIG. 2B.

Turning to FIG. 2B, a data flow diagram illustrating data flows, data processing, and/or other operations that may be performed by the system of FIG. 1 in accordance with an embodiment is shown.

To manage workloads, the locations of workload components may be by analyzed to identify whether migration of the workload components to other infrastructure may provide benefits for the workload. If the migration provides sufficient benefit, then a potential migration of the workload components may be initiated.

To establish a potential migration plan for evaluation, migration planning process 260 may be performed. During migration planning process 260, one or more workload graphs (e.g., 240A, 240B) may be analyzed through sub-graph encapsulation. Workload graphs 240A-240B may be data structure defining graph representations similar to that shown in FIG. 2A, but for any number of different workloads.

To analyze workload graphs 240A-240B, information from edge component capabilities 242 may be used to identify workload components corresponding to the nodes of the workload graphs that may be hosted by edge infrastructure (e.g., the workload components may be within computing resource limitations of the edge infrastructure components). Then, a selection of some of the identified nodes may be made. Nodes from multiple graphs may be selected, for example, when multiple workloads are being considered for co-migration.

The selection may be made using a global optimization algorithm. The global optimization algorithm may be, for example, a genetic algorithm, a synthetic annealing algorithm, and/or another method.

If the global optimization algorithm is a genetic algorithm, any number of species may be initially defined. Each species may include a selection of some of the nodes of the workload graphs. As information reflecting the fitness of each species is identified (discussed later), various species may undergo an exchange of genes (e.g., selected nodes) to establish new species. More fit species may undergo gene exchange with one another to attempt to identify even more fit species. Refer to FIGS. 2C-2D for additional details regarding establishing potential migration plans.

Each of the species may be used to define corresponding migration plans (e.g., 244) as output of migration planning process 260. A migration plan may be a data structure specifying (i) nodes of the workload graph 240, and (ii) locations to which workload components corresponding to the nodes are to be migrated under the migration plan. Thus, workload graph 240 and migration plan 244 may define a potential new distribution of workload components for any number of workloads, with some being moved from existing locations as specified by the workload graphs. In other words, migration plan 244 may indicate a difference between an existing distribution of workload components across a first set of locations (e.g., in cloud infrastructure) to a new distribution of the workload components across a second set of locations (e.g., combinations of cloud and edge infrastructure).

As migration plans are obtained, each migration plan may be subjected to evaluation process 262. During evaluation process 262, operation of the new distribution of the workload components may be simulated. The simulation may be performed using any simulation architecture. For example, a digital twin of the cloud and edge infrastructure may be used to simulate workload performance for the new distribution of the workload components. The digital twin may be configured to match the new distribution of workload components. To ascertain the likely workload performance of the new distribution of the workload components under real conditions, input data used to drive previous operations (e.g., historical data) of the existing distribution of the workload components may be used to drive the simulation. Such input data may have been previously recorded and stored in historic input data 245.

The performance of the potential new distribution of the workload components may be identified by monitoring any number of operational metrics (e.g., that were similarly monitored during operation of the existing distribution of the workload components while the input data was recorded for use in the simulation). A workload performance estimate 252 for each migration plan may be obtained through evaluation process 262.

To ascertain the fitness of the migration plan, rating process 264 may be performed. During rating process 264, workload performance estimate 252, workload objective 246, and workload performance 248 may be ingested and used to obtain a rating for the migration plan.

Workload objectives 246 may specify any number of goals for the workloads considered for migration under migration plan 244. For example, the workload goals may reflect service level objectives for entities for which the workloads will be performed.

Workload performances 248 may indicate the previous performances of workloads (e.g., under consideration for co-migration) with the existing distribution of workload components. Thus, workload performances 248 and workload performance estimate 252 may be usable to identify differences in expected performance of the workloads if migrated under the migration plan.

To assign a numerical rating to the migration plan usable for comparison purposes, an objective function may be used. The objective function may define a scalar or vector value representing a rating of a migration plan. For example, the objective function may identify deltas between different aspects of the workload performances (e.g., previous to estimated), and may weight the aspects with respect to one another based on workload objectives 246. The result of ingesting the information into the objective function may be migration plan rating 250. Migration plan rating 250 may include a numerical value or values usable to compare different migration plans.

Migration plan rating 250 may be used (i) to ascertain how gene exchange between different species is to be performed to obtain new species, and (ii) ascertain whether a species that is sufficiently fit has been identified. For example, processes 260-264 may be repeatedly performed, and the resulting migration plan ratings may be compared to thresholds or other types of criteria to identify whether a sufficiently fit migration plan has been identified.

Once identified, migration plan 244 may be used to drive migration process 266. During migration process 266 (i) information regarding a migration plan may be presented to decision makers (e.g., using a graphical user interface, refer to FIG. 3 for additional details), (ii) acceptance or rejection of migration plans may be identified, and (iii) if an acceptable migration plan is identified, then a migration may be initiated and/or performed. Refer to FIG. 2E for additional details regarding performance of a migration.

Any of the processes (e.g., 260-266) shown in FIG. 2B may be implemented using programmable hardware and corresponding instructions usable to program the programmable hardware, customized hardware specifically formed to perform the process, and/or combinations of programmable and static hardware.

Any of the data structures (e.g., 240-252) shown in FIG. 2B may be stored in non-transitory storage and/or memory. Any of the data structures may be implemented using, for example, lists, tables, databases, linked lists, unstructured data, and/or other types of data structures.

As discussed with respect to FIG. 2A, multiple graph representation of workload components for workloads may be used to identify potential migration plans for workload components.

Turning to FIG. 2C, a first diagram of a multiple graph representations for multiple workloads in accordance with an embodiment is shown. The graph representations shown in FIG. 2A may be similar to first graph representation 230 shown in FIG. 2C. Second graph representation 232 may be a graph representation for a different workload. If the workloads on which these graph representations 230-232 are selected for potential co-migration, the graphs may be co-analyzed to identify potential migration plans.

To identify a potential migration plan, a portion of each of the graph representations may be encapsulated (e.g., nodes 202, 208, 222 are drawn with infill to illustrate that the nodes are encapsulated). The encapsulated portion of the graph representations may be used (i) to define a migration plan, and (ii) establish a simulation through which performance of a new distribution of workload components for workloads defined by the migration plan may be identified.

To establish the simulation, a simulation may prepared where (i) the workload components for which corresponding nodes that are not part of the encapsulated portion of the graph are retained on cloud infrastructure in the simulation and (ii) the workload components for which corresponding nodes are part of the encapsulated portion of the graph are hosted by edge infrastructure in the simulation. Consequently, in the simulation, some of the edges (e.g., 210, 216, 218, 221, drawn in dashing in FIG. 2C to highlight these edges) may also reflect new communication channels between the edge infrastructure and cloud infrastructure.

Once the simulation is established, the simulation may be run to estimate the likely performance of the workloads under the new workload component distribution if the migration plan is implemented. The simulated performance may then be used to rate the migration plan which, in turn, may be used to identify new species.

For example, consider a scenario where a genetic algorithm represents each distribution of the workload components using a single bit of a binary sequence. In the example graph representation shown in FIG. 2C, this binary sequence may include 1 bit corresponding to each of the eight nodes. The value of each bit may represent whether the workload component for the node is hosted by cloud infrastructure or edge infrastructure. For FIG. 2C, this binary sequence may be 01001010 (with the first bit corresponding to node 200, the second bit corresponding to node 202, the third bit corresponding to node 204, the fourth bit corresponding to note 206, the fifth bit corresponding to node 208, the sixth bit corresponding to node 220, the seventh bit corresponding to node 222, and the eight bit corresponding to node 224).

Now, if this migration plan is rated highly, and a second migration plan (not shown) having a binary sequence of 00011111 is also rated highly, an offspring of these two species may be established through gene exchange. The offspring may be the binary sequence 00011110 (e.g., if the second, fourth, and sixth bits of the first species are replaced with the corresponding bits of the second species as part of the gene exchange, and which may depend on the specific algorithm used to guide gene exchange to establish new species).

Turning to FIG. 2D, a second diagram of a multiple graph representations for multiple workloads in accordance with an embodiment is shown. The graph representations shown in FIG. 2D may be similar to that shown in FIG. 2C. However, the graph representation shown in FIG. 2D may reflect the new species (i.e., the binary sequence 00011110) obtained through gene exchange conducted during a cycle of the global optimization process. This new species may be used to define and evaluate a new migration plan, similarly to that described with respect to FIG. 2C. If the new migration plan is sufficiently fit, the new migration plan may be implemented.

Turning to FIG. 2E, a diagram of an example new distribution of workload components in accordance with an embodiment is shown. Continuing with the discussion of FIG. 2D, if the migration plan is sufficiently fit, then the new migration plan may be implemented resulting in a new distribution of workload components. An original distribution of workload components (e.g., all workload components hosted by cloud infrastructure) may be updated based on the migration plan. In this example, workload components corresponding to nodes 206, 208, 220, and 222 as shown in FIG. 2D may be marked for migration to edge infrastructure.

Thus, a resulting distribution may include (i) workload components 282A-282C, 284A being hosted by cloud infrastructure 280, and (ii) workload components 282D-282E, 284B, 284C hosted by edge components (e.g., 290, 294) of edge infrastructure 288. Work component 282A may correspond to node 200, workload component 282B may correspond to node 202, workload component 282C may correspond to node 204, workload component 282D may correspond to node 206, workload component 282E may correspond to node 208, workload component 284A may correspond to node 224, workload component 284B may correspond to node 220, and workload component 284C may correspond to node 222.

Workload components 282A-282D may support a first workload, and workload components 284A-284C may support a second workload. Each of the workloads may be performed for different organizations. Thus, at least some of the workload components that support workloads for different organization may be co-located on the same edge components (e.g., 292), while other workload components may be located on different edge components (e.g., 282E on edge component 294 and workload component 284C on edge component 296).

In this manner, co-located workload components on edge infrastructure may improve the efficiency of computing resource use. For example, through global optimization, workload components that are likely to exert higher loads on host components at different points in time may be likely to be co-located with one another. Consequently, the load on edge components may be more uniform overtime, and less likely to exceed the capacity of the respective edge component.

Once a candidate migration plan has been identified, information regarding the migration plan and/or other migration plans may be presented to any number of decision makers via a graphical user interface.

Turning to FIG. 3, a diagram of an example graphical user interface 300 in accordance with an embodiment is shown. The graphical user interface may facilitate comparison between different migration plans and/or selection of migration plans for implementation.

To facilitate comparison, graphical user interface 300 may include any number of migration plan graphical elements (e.g., 310-320). Each migration plan graphical element may correspond to a potential migration plan. The migration plan graphical elements may be arranged in a grid or other manner that facilitates comparison between the different migration plans. Each migration plan graphical element may be implemented, for example, using a shape such as a box.

To facilitate comparison between migration plans, any number of performance metric representations (e.g., 312-314) may be positioned with each migration plan graphical element. The performance metric representations may be graphical representations of the performance of a workload if migrated as specified by the migration plan associated with the corresponding migration plan graphical element. Performance metric representations for similar metrics may be positioned with each of the migration plan graphical elements.

The performance metric representations may include textual descriptions of metrics, graphical representations of the metric within a range over which the metric may range (e.g., such as a meter symbol with a dial superimposed on the meter and pointed based on the value of the corresponding metric), etc.

Any of the migration plan elements may also be interactive. For example, a user may select any of the migration plan graphical elements to access pop-up graphical elements or other information elements. These information elements may provide information regarding the migration process. For example, the information elements may specify quantities of workload components that will be migrated as part of the migration plan, estimated durations of time for completion of migration plans, etc.

Once decision makers have explored the migration plans, the decision makers may select any of the migration plan graphical elements and provide user feedback indicating that a corresponding migration plan is to be implemented. If the migration plan involved co-migration of multiple workloads from different organizations, a voting process may be implemented to select a migration plan for implementation.

The decision makers may case votes for different plans, provide numerical ratings for different migrations, and/or otherwise provide user input reflecting a preference of the decision maker with respect to different migration plans. The migration plans may then be rank ordered based on the voting, and a migration plan may be selected for implementation based as least on the rank ordering of the migration plans.

As discussed above, the components of FIG. 1 may perform various methods to manage operation of data processing systems. FIG. 4 illustrates a method that may be performed by the components of the system of FIG. 1. In the diagram discussed below and shown in FIG. 4, any of the operations may be repeated, performed in different orders, and/or performed in parallel with or in a partially overlapping in time manner with other operations.

Turning to FIG. 4, a flow diagram illustrating a method for managing distribution of workloads across infrastructure in accordance with an embodiment is shown. The method may be performed by any of cloud infrastructure 100, edge infrastructure 110, workload manager 120, and/or other components of the system shown in FIG. 1.

Prior to operation 400, a first workload for a first organization and a second workload for a second organization may be hosted by cloud infrastructure of the infrastructure. Edge infrastructure may be available to host workload components that support performance of the workloads.

At operation 400, a first workload performed by cloud infrastructure is identified for at least partial migration to shared edge infrastructure. The first workload may be identified by (i) obtaining information regarding the first workload from another entity, (ii) by scanning the cloud infrastructure for workloads that may be migrated, and/or via other methods.

For example, the organizations for which the workloads are performed may request evaluation of options for distribution of the workloads. The request may be for co-migration of workload components for the workloads to shared edge infrastructure.

At operation 402, a second workload performed by the cloud infrastructure is identified for at least partial migration to the shared edge infrastructure. The second workload may be identified in a similar manner to the first workload. The first and second workloads may be similar or dissimilar workloads.

At operation 404, a first graph representation for the first workload and a second graph representation for the second workload is obtained. The graph representations may be obtained by (i) reading the graph representations from storage, (ii) receiving the graph representations from other entities, (iii) by generating the graph representations, and/or via other methods.

The graph representation may be generated by, for each workload: (i) identifying workload components of the workload, (ii) identifying interactions between the workload components, and (iii) establishing nodes based on the workload components and edges between some of the nodes based on the interactions between the workload components. For example, the edges may be based on data flows between the workload components that support operation of the workload components.

At operation 406, a potential migration plan for the first workload and the second workload is obtained using the first graph representation, the second graph representation, and capabilities of edge components of edge infrastructure. The potential migration plan may be obtained by (i) identifying edge components of the shared edge infrastructure that may host the workload components based on the capabilities of the edge components, and (ii) performing a global optimization process.

The global optimization process may use a genetic algorithm that attempts to identify a best option for a given set of constraints through a process of establishing species, identifying fitness of the species, and obtaining new species through exchange of information between the species based on the fitness of each of the species.

Each of the species may be implemented using a binary representation of the nodes of the two graph representations. Each element of the binary representation may correspond to one of the nodes. The value of each element may indicate whether the workload corresponding to the node will be retained on cloud infrastructure or migrated to the shared edge infrastructure.

The fitness of each species may be identified using an objective function that ranks each species. The objective function may, in the context of migration plans, take into account, for example, (i) a level of compliance with service level agreements, (ii) resource cost of performing a migration, (iii) performance gains from the migration, and/or other factors. Each species may represent a different potential migration plan. Information regarding the fitness of an evaluated species may be used to obtain new species thereby improving the likelihood of new migration plans being more likely to be more highly rated.

To establish an initial population of species, any method may be implemented. The initial population of species may be evaluated for fitness, and then new species may be established through gene exchange (e.g., with higher rated species being more likely to exchange genes and produce offspring in each generation of a population of species). As subsequent new species are developed, the fitness of each new specifies may be incorporated in the new species generation process such that more fit species are likely to be used as a basis for establishing additional new species.

While described with respect to genetic algorithms, it will be appreciated that other global optimization processes may be used to identify migration plans without departing from embodiments disclosed herein.

As part of the global optimization process, the two graph representations may be divided into sub-graphs (e.g., for encapsulation). A portion of the sub-graphs may be selected (e.g., as discussed with respect to FIGS. 2C-2D). The workloads corresponding to the nodes of the selected sub-graphs may be identified in the migration plan for migration to the shared edge infrastructure. Thus, sub-portions of the workload may be moved to the edge infrastructure in this manner.

At operation 408, the potential migration plan is evaluated to obtain a workload performance estimate. The potential migration plan may be evaluated by simulating performance of the two workloads after some workload components are migrated as specified by the potential migration plan. The simulation may be conducted using any simulation system (e.g., digital twin, stochastic modeling, etc.). The simulation may use input data used in a previous performance of the two workloads (e.g., while only hosted by cloud infrastructure). Consequently, previously monitored performance of the two workloads may be compared to simulated performance of the two workloads post migration. The simulation may be monitored to obtain the workload performance estimate.

To implement the simulations, first input data for a past performance of the first workload may be obtained. Similarly, second input data for a past performance of the second workload may be obtained. The obtained first and second input data may be used to drive simulation of the workload.

For example, simulation components for the simulation may be established based on an edge components of the shared edge infrastructure. The simulation components may be portions of a digital twin model. Once established, the simulation components may be configured to emulate the operation of corresponding workload components. The simulation components may be configured by establishing data flows between components (e.g., logical flows), establishing processing that will be performed, etc.

For example, if a potential migration plan specifies that the workload component of the first workload and the workload component of the second workload are to be hosted by the edge component of the shared edge infrastructure, then the simulation component may include a digital representation of the edge component with emulated workload components hosted by the simulation component. To run the simulation, the first input data may include a first portion of input data that drove operation of the workload component of the first workload, and the second input data may include a second portion of the input data that drove operation of the workload component of the second workload. Consequently, the resulting simulated operation of the simulated workload component may estimate how the workload would have been performed if the potential migration plan had been performed. Accordingly, a direct comparison between actual performance and simulated performance may be made. This comparison may be used as part of rating the potential migration plan, discussed below.

At operation 410, the potential migration plan is rated based on the workload performance estimate. The potential migration plan may also be rated based on, for example, a performance of the two workloads by the cloud infrastructure, and/or a workload objective. The potential migration plan may be rated by ingesting the aforementioned information into an objective function. The objective function may output a numerical value or a set of numerical values that indicate the rating of the potential migration plan.

At operation 412, a determination is made regarding whether to implement the potential migration plan. The determination may be made by presenting information regarding any number of potential migration plans to decision makers via a graphical user interface. The decision makers may review the information and either select one of the migration plans for implementation or not select one of the migration plans. The selection may be made via a voting process to establish consensus.

Prior to presenting the information to the decisions makers, the rating for the potential migration plan may be compared to criteria. If the criteria (e.g., thresholds) is met, then the information may be presented to the decision makers. Otherwise, it may be determined that the potential migration plan is not to be implemented.

If it is determined that the potential migration plan is to be implemented, then the method may proceed to operation 414. Otherwise, the method may return to operation 406. If the method returns to operation 404, the rating may be used to guide selection of a new potential migration plans through use of the global optimization process. The global optimization process make use of the rating to make better selections for migration plans.

At operation 414, at least a portion of the first workload is and a least a portion of the second workload is migrated from the cloud infrastructure to the shared edge infrastructure based on the potential migration plan. The workload may be migrated by (i) instantiating new instances of workload components in the edge infrastructure based on the migration plan, (ii) beginning execution of the new instances of the workload components, (iii) redirecting data flows with respect to the executing new instances of the workload components, (iv) decommissioning the old instances of the workload components on the cloud infrastructure that have been migrated to the shared edge infrastructure, and/or orchestrating performance of other actions to rearchitect the workload components for the two workloads based on the migration plan.

The method may end following operation 414.

Figure 5:
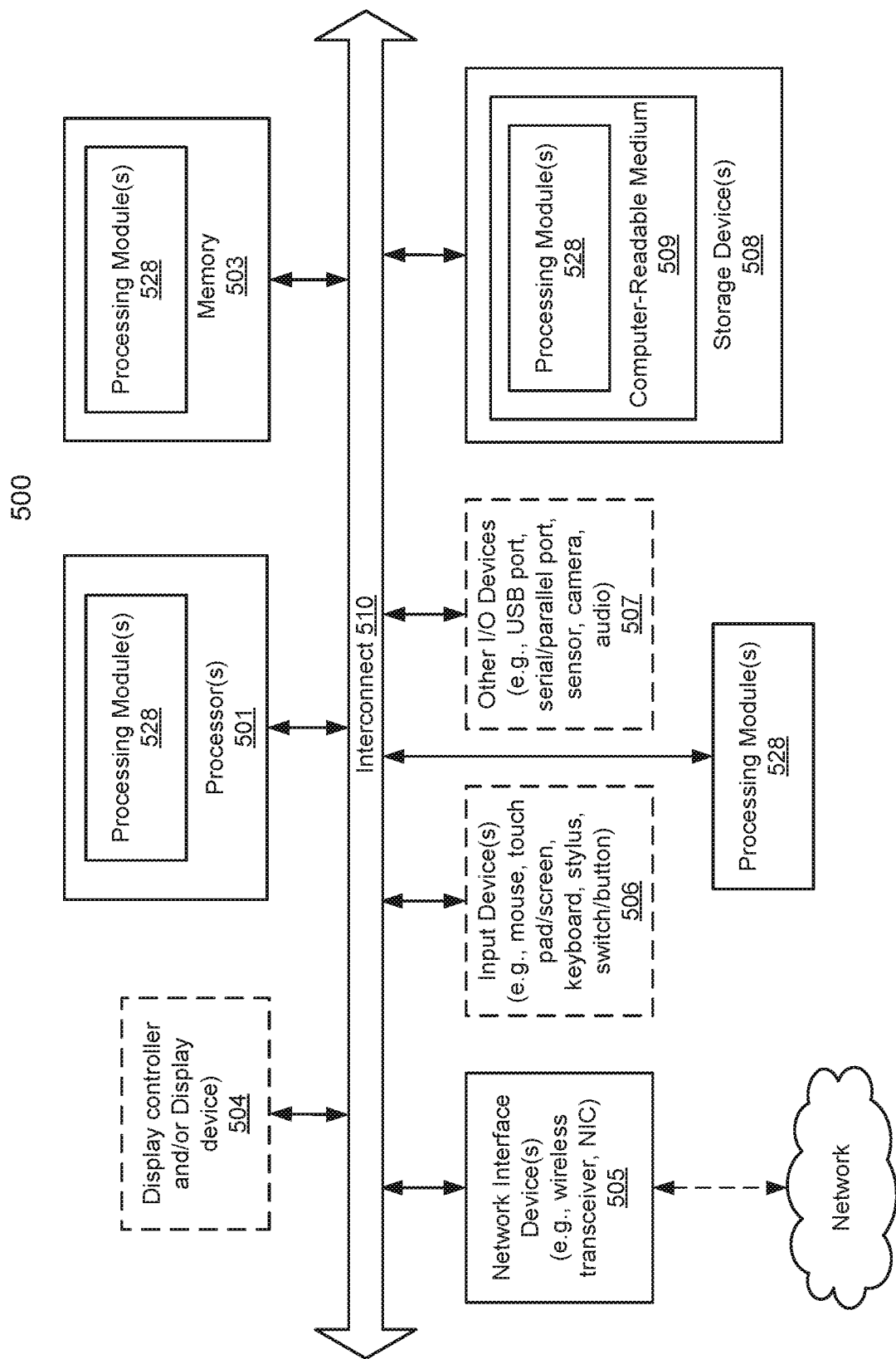
FIG. 5 shows a block diagram illustrating a data processing system in accordance with an embodiment.

Any of the components illustrated in FIGS. 1-3 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing workload distribution across infrastructure, the method comprising:
    identifying a first workload performed by cloud infrastructure of the infrastructure for at least partial migration to shared edge infrastructure of the infrastructure;
    identifying a second workload performed by the cloud infrastructure for at least partial migration to the shared edge infrastructure;
    obtaining a first graph representation of the first workload and a second graph representation of the second workload;
    obtaining a potential migration plan using the first graph representation, the second graph representation, and capabilities of edge components of the shared edge infrastructure;
    evaluating the potential migration plan to obtain a workload performance estimate;
    rating the potential migration plan based on the workload performance estimate;
    making a determination regarding whether to implement the potential migration plan based at least in part on the rating of the potential migration plan; and
    in an instance of the determination where the potential migration plan is to be implemented:
        migrating, based on the potential migration plan, at least a portion of the first workload from the cloud infrastructure to the shared edge infrastructure and at least a portion of the second workload from the cloud infrastructure to the shared edge infrastructure.

2. The method of claim 1, wherein evaluating the potential migration plan comprises:
    obtaining first input data for a past performance of the first workload;
    obtaining second input data for a past performance of the second workload; and
    simulating performance of the workload after the migrating using the first input data and the second input data.

3. The method of claim 2, wherein simulating the performance comprises:
    establishing a simulation component based on an edge component of the shared edge infrastructure; and
    configuring, based on the potential migration plan, the simulation component based on a workload component of the first workload and a workload component of the second workload.

4. The method of claim 3, wherein the potential migration plan specifies that the workload component of the first workload and the workload component of the second workload are to be hosted by the edge component of the shared edge infrastructure.

5. The method of claim 4, wherein the first input data comprises a first portion of input data that drove operation of the workload component of the first workload, and the second input data comprises a second portion of the input data that drove operation of the workload component of the second workload.

6. The method of claim 1, wherein the potential migration plan is obtained using global optimization.

7. The method of claim 6, wherein the global optimization is based on a genetic algorithm used to identify portions of the first graph representation and the second graph representation, the potential migration plan being based on the identified portions.

8. The method of claim 7, wherein the first graph representation comprises nodes and edges connecting a portion of the nodes.

9. The method of claim 8, wherein the nodes are based on workload components that support performance of the first workload, the workload components performing data processing actions.

10. The method of claim 9, wherein the edges are based on interactions between the workload components that support performance of the first workload.

11. A non-transitory machine-readable medium having instructions stored therein, which when executed by a processor, cause the processor to perform operations for managing workload distribution across infrastructure, the operations comprising:
    identifying a first workload performed by cloud infrastructure of the infrastructure for at least partial migration to shared edge infrastructure of the infrastructure;
    identifying a second workload performed by the cloud infrastructure for at least partial migration to the shared edge infrastructure;

obtaining a first graph representation of the first workload and a second graph representation of the second workload;

obtaining a potential migration plan using the first graph representation, the second graph representation, and capabilities of edge components of the shared edge infrastructure;

evaluating the potential migration plan to obtain a workload performance estimate;

rating the potential migration plan based on the workload performance estimate;

making a determination regarding whether to implement the potential migration plan based at least in part on the rating of the potential migration plan;

in an instance of the determination where the potential migration plan is to be implemented:
migrating, based on the potential migration plan, at least a portion of the first workload from the cloud infrastructure to the shared edge infrastructure and at least a portion of the second workload from the cloud infrastructure to the shared edge infrastructure.

12. The non-transitory machine-readable medium of claim 11, wherein evaluating the potential migration plan comprises:
obtaining first input data for a past performance of the first workload;
obtaining second input data for a past performance of the second workload; and
simulating performance of the workload after the migrating using the first input data and the second input data.

13. The non-transitory machine-readable medium of claim 12, wherein simulating the performance comprises:
establishing a simulation component based on an edge component of the shared edge infrastructure; and
configuring, based on the potential migration plan, the simulation component based on a workload component of the first workload and a workload component of the second workload.

14. The non-transitory machine-readable medium of claim 13, wherein the potential migration plan specifies that the workload component of the first workload and the workload component of the second workload are to be hosted by the edge component of the shared edge infrastructure.

15. The non-transitory machine-readable medium of claim 14, wherein the first input data comprises a first portion of input data that drove operation of the workload component of the first workload, and the second input data comprises a second portion of the input data that drove operation of the workload component of the second workload.

16. A data processing system, comprising:
a processor; and
a memory coupled to the processor to store instructions, which when executed by the processor, cause the processor to perform operations for managing workload distribution across infrastructure, the operations comprising:

identifying a first workload performed by cloud infrastructure of the infrastructure for at least partial migration to shared edge infrastructure of the infrastructure;

identifying a second workload performed by the cloud infrastructure for at least partial migration to the shared edge infrastructure;

obtaining a first graph representation of the first workload and a second graph representation of the second workload;

obtaining a potential migration plan using the first graph representation, the second graph representation, and capabilities of edge components of the shared edge infrastructure;

evaluating the potential migration plan to obtain a workload performance estimate;

rating the potential migration plan based on the workload performance estimate;

making a determination regarding whether to implement the potential migration plan based at least in part on the rating of the potential migration plan;

in an instance of the determination where the potential migration plan is to be implemented:
migrating, based on the potential migration plan, at least a portion of the first workload from the cloud infrastructure to the shared edge infrastructure and at least a portion of the second workload from the cloud infrastructure to the shared edge infrastructure.

17. The data processing system of claim 16, wherein evaluating the potential migration plan comprises:
obtaining first input data for a past performance of the first workload;
obtaining second input data for a past performance of the second workload; and
simulating performance of the workload after the migrating using the first input data and the second input data.

18. The data processing system of claim 17, wherein simulating the performance comprises:
establishing a simulation component based on an edge component of the shared edge infrastructure; and
configuring, based on the potential migration plan, the simulation component based on a workload component of the first workload and a workload component of the second workload.

19. The data processing system of claim 18, wherein the potential migration plan specifies that the workload component of the first workload and the workload component of the second workload are to be hosted by the edge component of the shared edge infrastructure.

20. The data processing system of claim 19, wherein the first input data comprises a first portion of input data that drove operation of the workload component of the first workload, and the second input data comprises a second portion of the input data that drove operation of the workload component of the second workload.

* * * * *